(12) United States Patent
Sestito et al.

(10) Patent No.: US 7,112,008 B2
(45) Date of Patent: Sep. 26, 2006

(54) FLOATING CONSTRUCTION FOR LAUNCHING PIPELINES EVEN IN LOW-DEPTH CONDITIONS

(75) Inventors: Ilario Sestito, Milan (IT); Rosolino Tarenzi, Codogno-V. Costa (IT)

(73) Assignee: ISEA S.p.A., Piacenza (IT)

( * ) Notice: Subject to any disclaimer, the term of this patent is extended or adjusted under 35 U.S.C. 154(b) by 0 days.

(21) Appl. No.: 11/255,260

(22) Filed: Oct. 21, 2005

(65) Prior Publication Data

US 2006/0088383 A1    Apr. 27, 2006

(30) Foreign Application Priority Data

Oct. 25, 2004    (IT) .......................... MI2004A2030

(51) Int. Cl.
*F16L 1/24*    (2006.01)

(52) U.S. Cl. ........................ 405/171; 405/158; 441/133

(58) Field of Classification Search ................ 405/162, 405/171; 114/266, 267; 441/133
See application file for complete search history.

(56) References Cited

U.S. PATENT DOCUMENTS

| | | | | | |
|---|---|---|---|---|---|
| 3,428,011 | A | * | 2/1969 | Motter | 114/260 |
| 4,068,492 | A | * | 1/1978 | Reneau | 405/170 |
| 4,121,529 | A | * | 10/1978 | Smith et al. | 405/171 |
| 4,631,039 | A | * | 12/1986 | Meriwether | 441/133 |
| 6,705,029 | B1 | * | 3/2004 | Anderson | 405/162 |

* cited by examiner

*Primary Examiner*—Frederick L. Lagman
(74) *Attorney, Agent, or Firm*—Hedman & Costigan, P.C.; James V. Costigan

(57) ABSTRACT

A floating construction for launching pipelines, even in low-depth conditions, comprises at least a hollow floating body, engageable with a supporting framework, comprising removably coupling means for providing a removable coupling with a pipeline, removable latching means which can be actuated from the outside for removably latching the pipelines being moreover provided.

9 Claims, 5 Drawing Sheets

FLOATING CONSTRUCTION FOR LAUNCHING PIPELINES EVEN IN LOW-DEPTH CONDITIONS

BACKGROUND OF THE INVENTION

The present invention relates to a floating construction for supporting pipelines on water, even in low-depth conditions.

Floating constructions for supporting pipelines on water, comprising a body which is comprising a body which is filled-in with a polyurethane foamed material, are known.

Such an approach does not allow to adjust, depending on the contingent requirements, the floating upward directed force.

A further problem is that, in several cases, the pipeline coupling means are difficult to be properly made.

Due to the above reason, great operating difficulties for disengaging or unlatching the pipeline are encountered.

SUMMARY OF THE INVENTION

Accordingly, the aim of the present invention is to overcome the above mentioned drawbacks, by providing a floating construction for supporting pipelines, even in low-depth conditions, which allows to quickly and easily adjust the floating upward directed force, thereby allowing the floating construction to be easily fitted to all contingent requirements.

Within the scope of the above mentioned aim, a main object of the invention is to provide such a floating construction which can be quickly and easily coupled and disconnected to/from the pipelines to be supported, thereby simplifying all the required operating operations or steps.

Yet another object of the present invention is to provide such a floating construction which, owing to its specifically designed features, is very reliable and safe in operation.

Yet another object of the present invention is to provide such a pipeline supporting floating construction, which can be easily made and which, moreover, is very competitive from a mere economic standpoint.

According to one aspect of the present invention, the above mentioned aim and objects, as well as yet other objects, which will become more apparent hereinafter, are achieved by a floating construction for supporting pipelines on water, even in low-depth conditions, characterized in that said floating construction comprises at least a hollow floating body, engageable with a supporting framework defining removable coupling means for removable coupling with a pipeline, removable latching means for removably latching said pipeline.

BRIEF DESCRIPTION OF THE DRAWINGS

Further characteristics and advantages of the present invention will become more apparent hereinafter from the following detailed disclosure of a preferred, though not exclusive, embodiment of a floating construction for supporting pipelines, even in low-depth conditions, which is not illustrated, by way of an indicative but not limitative example, in the accompanying drawings, where.

DESCRIPTION OF THE PREFERRED EMBODIMENTS

Figure 1:
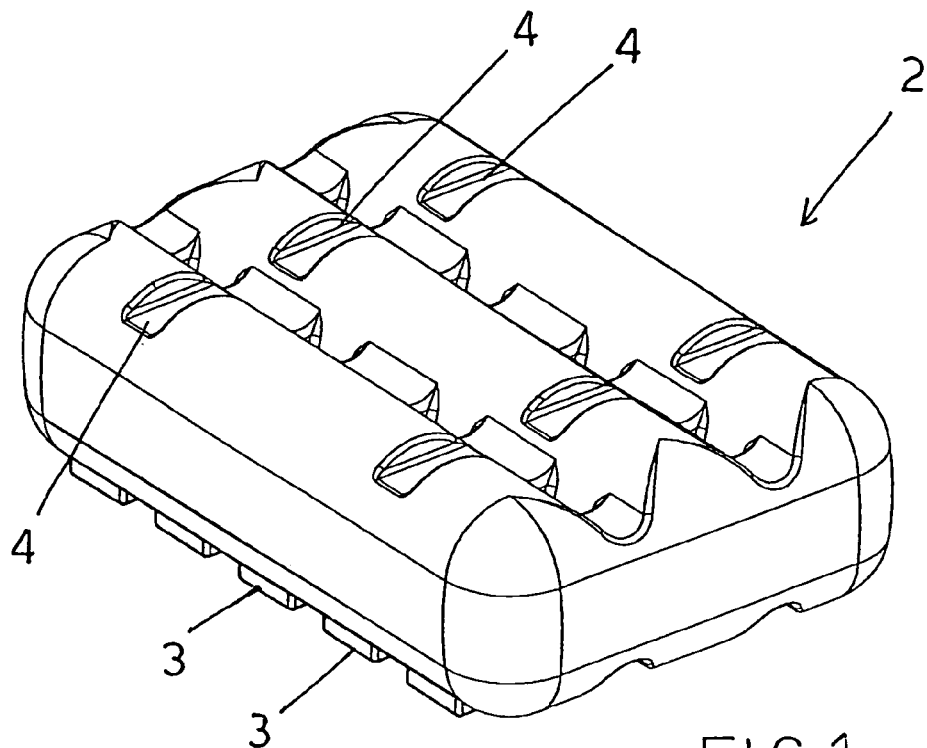
FIG. 1 is a schematic perspective view schematically showing the floating body.
Figure 2:
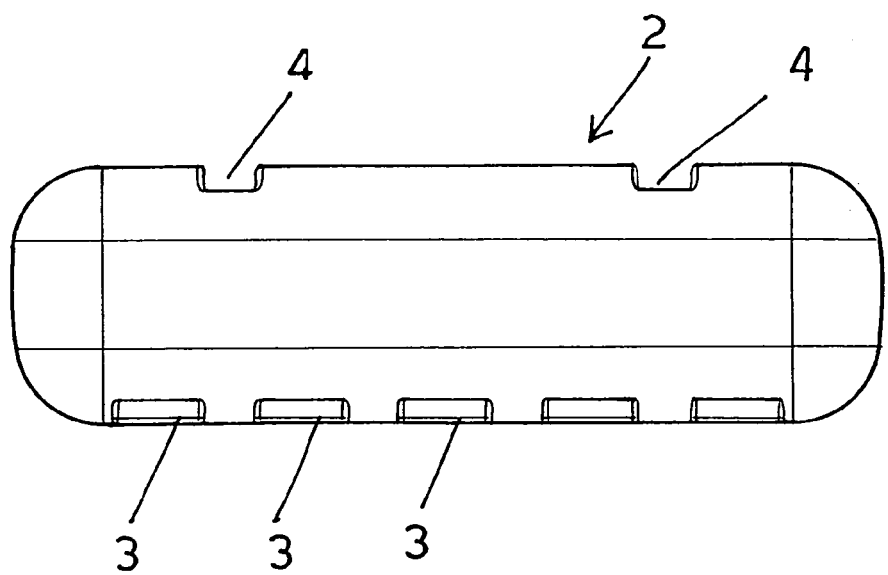
FIG. 2 is an elevation view also showing said floating body.
Figure 3:
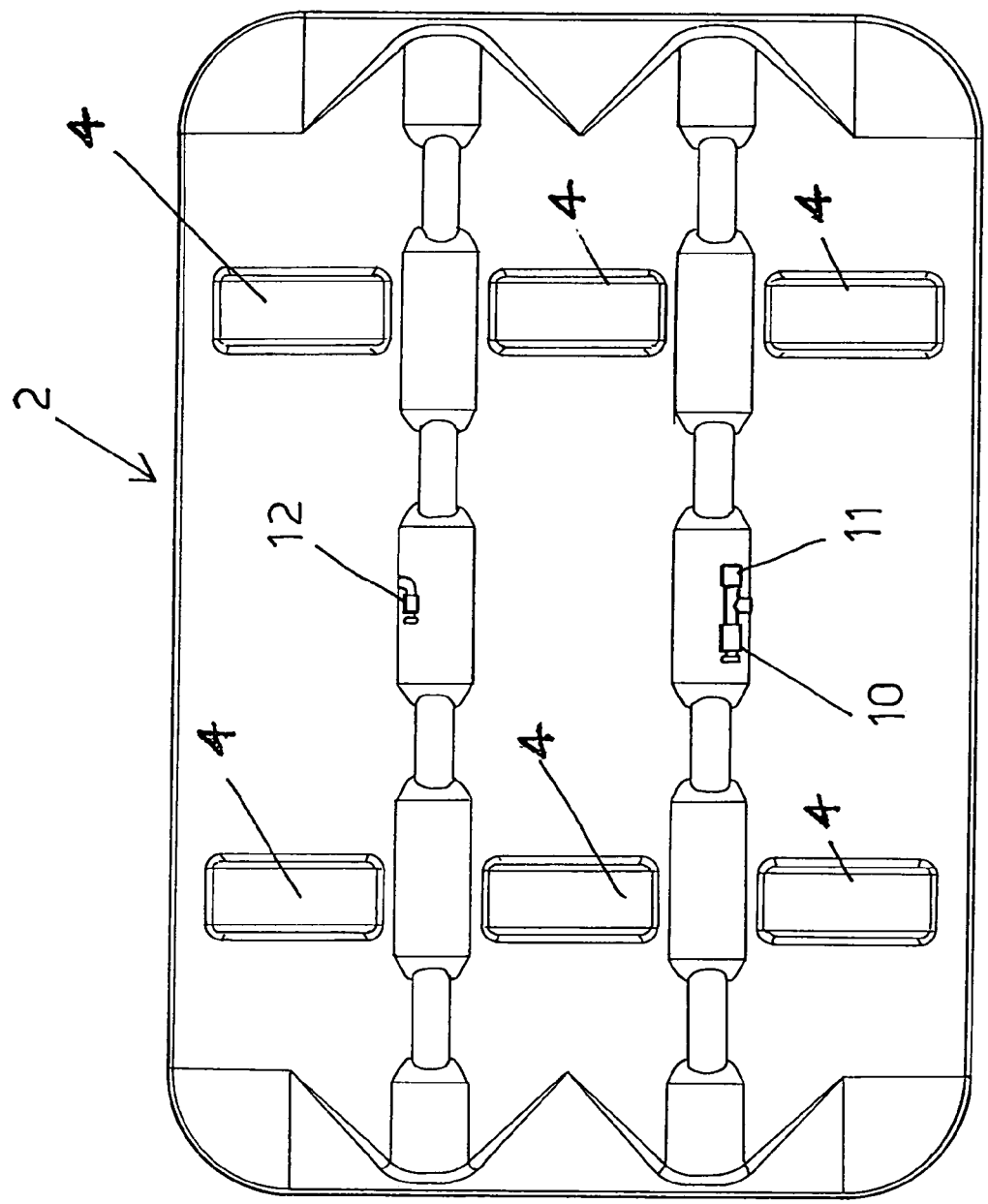
FIG. 3 is a top plan view of the floating body.
Figure 4:
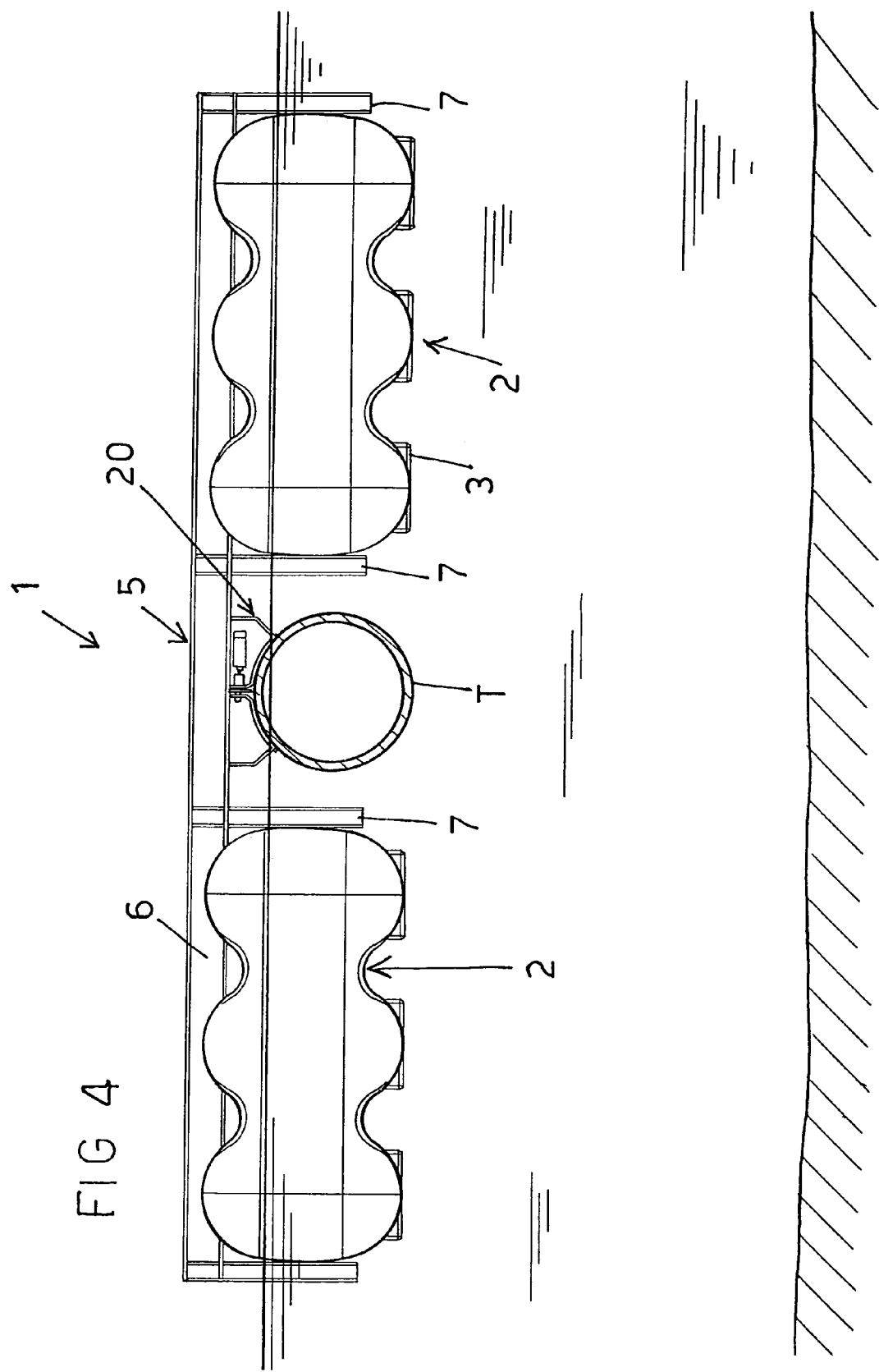
FIG. 4 shows the subject floating construction supporting a pipeline.
Figure 5:
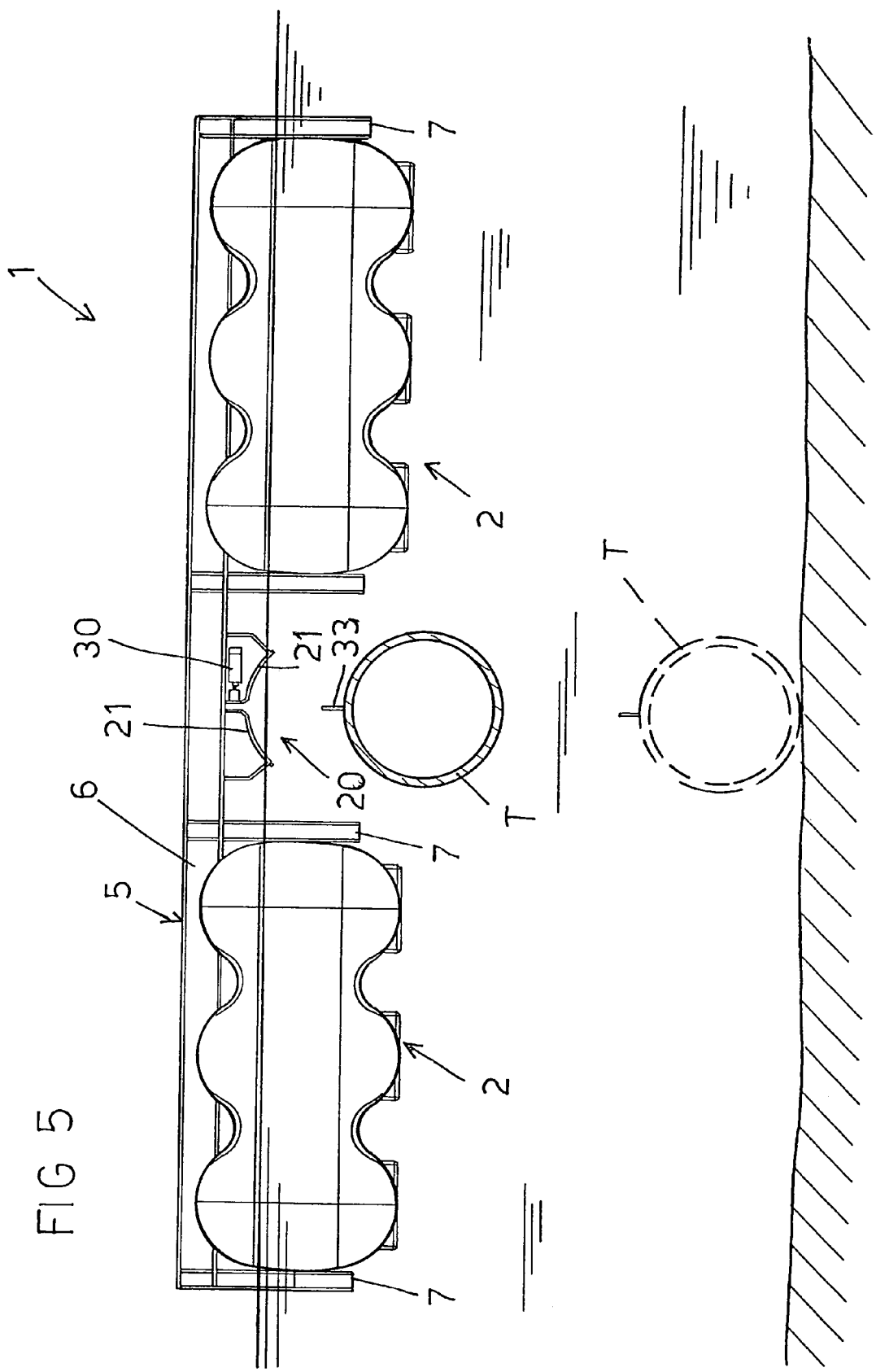
FIG. 5 shows the floating construction as the pipeline is disengaged therefrom.
Figure 6:
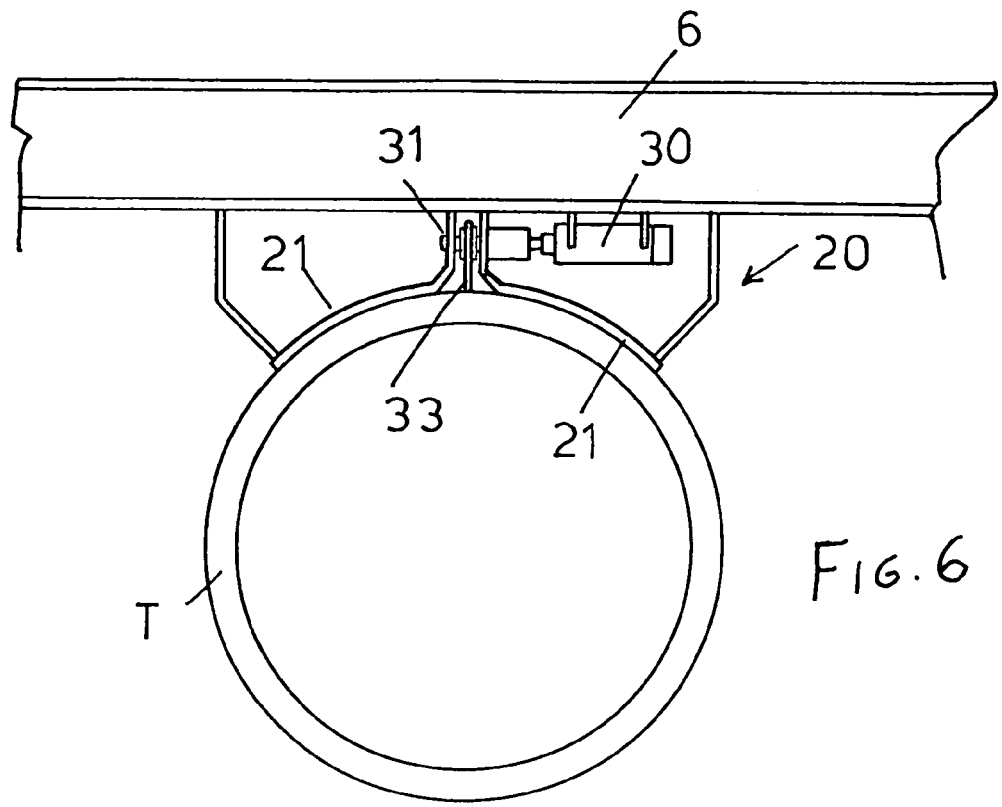
FIG. 6 shows, on an enlarged scale, the pipeline removable coupling means, and the pipeline removable latching means.
Figure 7:
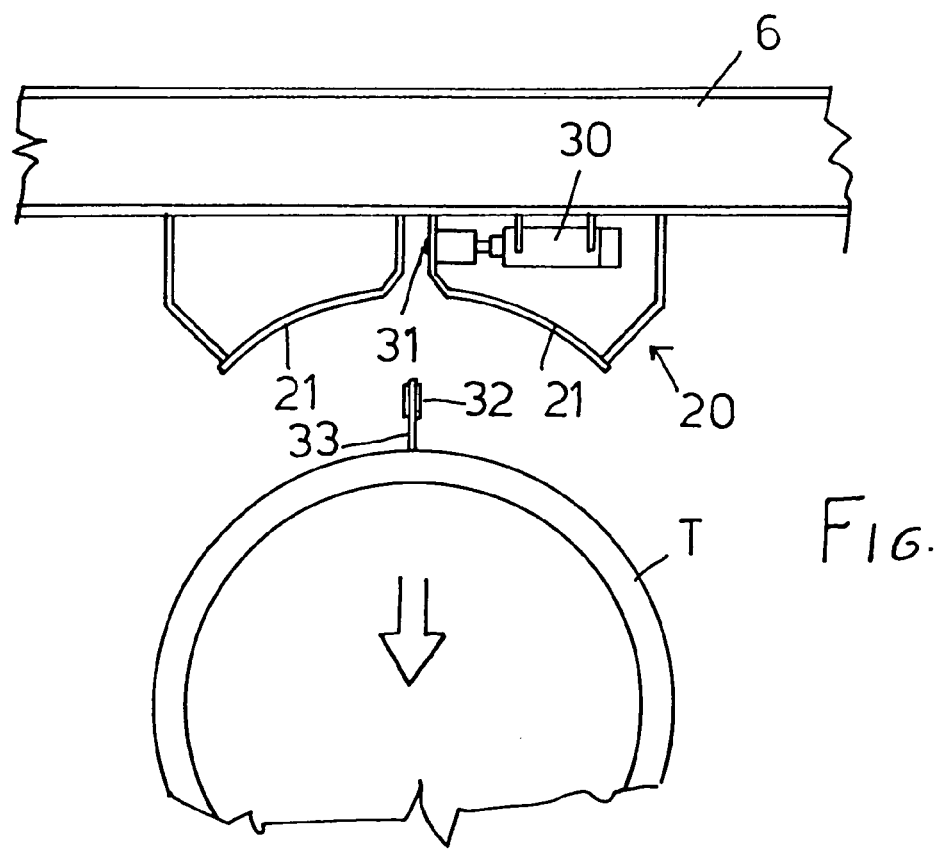
FIG. 7 shows, on an enlarged scale, an operating step for unlatching or disengaging the pipeline.

With reference to the number references of the above mentioned figures, the floating construction, for supporting pipelines, even in low-depth conditions, according to the invention, which has been generally indicated by the reference number 1, comprises a plurality of floating bodies 2.

Said floating bodies are advantageously designed with a substantially flattened configuration and are made from a polyethylene material through rotary-molding operations.

The thickness of the material to be used must be so designed as to fit or resist against the hydrostatic upward directed pushing force.

The floating body 2 is of hollow construction and comprises, at the bottom thereof, bearing projections 3 and, at the top part thereof, a plurality of recesses or imprints 4 for engaging with a supporting framework 5, which will be disclosed in a more detailed manner hereinafter.

Said floating body, as above mentioned, is of hollow construction and comprises an inlet element 10 for causing water to enter the hollow of the body, said inlet 10 comprising a check valve and a quick type of fitting.

A counter-pressure valve 11, which is calibrated to a preset level being moreover provided.

On the top face of the floating body is furthermore provided an air inlet 12, also including a quick type of attachment fitting.

The framework 5 advantageously comprises a plurality of top cross-members 6 which are housed in said recesses or imprints 4 and comprise vertical holding means 7 laterally engaging with the floating bodies 2, thereby practically allowing to properly connect said bodies to provide an easy support thereof.

The framework 5 comprises moreover coupling means for removably coupling a pipeline, said coupling means being generally indicated by the reference number 20 and comprising recessed portions 21, made of a sheet metal material, coupled to a cross member 6, thereby defining a coupling seat for a pipeline, as generally indicated by the letter T.

Latching means for removably latching the pipeline, and which are adapted to be driven for latching or unlatching a pipeline are advantageously provided at the removable coupling means 20.

Said latching means comprise a hydraulic cylinder 30, operating a locking pin 31, engaging in a corresponding seat 32 defined on gusset member 33, which is directly welded to the pipeline.

An outer central unit operates the hydraulic cylinder which, by driving said pin, allows the, pipeline to be disengaged or unlatched, thereby launching it.

It is moreover possible to use different removably latching means, without directly welding the gusset member 33 on the pipeline, and this alternating latching means may be constituted, for example, by less sophisticated systems, such as calendared sheet metal tie elements, coupled by coupling bolts.

The provision of the above mentioned water inlet 10 allows to properly "modulate" the floating upward directed force, by supplying a desired amount of water.

Thus, the system allows to modulate the floating upward directed force, by loading, through a pump system, the chamber defined inside the floating body.

More specifically, water is filled-in through the water inlet or loading manifold, where the above mentioned counter-pressure valve is arranged.

To empty the floating body camber, air is pumped from the air inlet duct 12, thereby providing inside the floating body a pressure allowing the counter-pressure 11 valve to be opened, thereby causing water to exit the hollow body.

The air inlet 12 also operates as a vent element.

In other words, the same valve also operates to allow air to exit as the container is filled-in by water.

To the foregoing it should be added that, if desired, it would be possible to use the above disclosed inlets to supply polyurethane foamed material, thereby providing a time-stable floating.

From the above disclosure it should be apparent that the invention fully achieves the intended aim and objects.

In fact. The invention provides a hollow floating body which, since it is provided with water and air inlet and outlet ports, allows to vary at will the floating upward directed force.

The invention, as disclosed, is susceptible to several modifications and variations, all of which will come within the scope of the invention.

Moreover, all the constructional details can be replaced by other technically equivalent elements.

In practicing the invention, the used materials, as well as the contingent size and shapes, can be any, depending on requirements.

The invention claimed is:

1. A floating construction for supporting on water a pipeline in low-depth conditions, said floating construction comprising at least a hollow floating body, engageable with a supporting framework defining removable coupling means for removable coupling with said pipeline, and removable latching means for removably latching said pipeline, characterized in that said floating body comprises a water inlet port and an air inlet and outlet port.

2. A floating construction, according to claim 1, characterized in that said floating construction further comprises, at said water inlet port of said floating body, a counter-pressure valve, allowing water to exit said floating body as a set pressure value inside said floating body is exceeded.

3. A floating construction, according to claim 1, characterized in that said supporting framework comprises a plurality of top cross-members to which vertical elements which can be laterally coupled to said floating body are connected.

4. A floating construction, according to claim 1, characterized in that said removable coupling means comprise a recessed portion defined on a bottom face of said supporting framework.

5. A floating construction, according to claim 1, characterized in that said removable latching means comprise a hydraulic cylinder, driving a pin element which can be engaged in a throughgoing seat formed on a gusset element welded to said pipeline.

6. A floating construction, according to claim 1, characterized in that said removable latching means comprise calendared metal sheet tie elements, connected by bolts to said pipeline.

7. A floating construction, according to claim 1, characterized in that said floating body has a substantially flattened configuration, and that is made of a rotary molded polyethylene material.

8. A floating construction, according to claim 1, characterized in that said floating body comprises, at a bottom portion thereof, a plurality of ground bearing projections.

9. A floating construction, according to claim 1, characterized in that said floating body comprises, at a top portion thereof, a plurality of imprints for coupling with said supporting framework.

* * * * *